(12) United States Patent
Collie et al.

(10) Patent No.: US 8,185,817 B2
(45) Date of Patent: May 22, 2012

(54) UTILIZING SPREADSHEET REFERENCES WITH GROUPED AGGREGATE VIEWS

(75) Inventors: Robert C. Collie, Redmond, WA (US); Amir Netz, Bellevue, WA (US); Paul J. Sanders, Mercer Island, WA (US); Cristian Petculescu, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 543 days.

(21) Appl. No.: 12/141,114

(22) Filed: Jun. 18, 2008

(65) Prior Publication Data

US 2009/0319880 A1 Dec. 24, 2009

(51) Int. Cl.
| | |
|---|---|
| G06F 17/00 | (2006.01) |
| G06F 17/20 | (2006.01) |
| G06F 17/21 | (2006.01) |
| G06F 17/22 | (2006.01) |
| G06F 3/048 | (2006.01) |

(52) U.S. Cl. ......... 715/219; 715/220; 715/267; 715/810
(58) Field of Classification Search .................. 715/219, 715/503, 504, 508, 538, 220, 267, 810
See application file for complete search history.

(56) References Cited

U.S. PATENT DOCUMENTS

| | | | |
|---|---|---|---|
| 5,055,998 A | | 10/1991 | Wright et al. |
| 5,845,300 A * | | 12/1998 | Comer et al. .................. 715/203 |
| 5,890,174 A * | | 3/1999 | Khanna et al. ................ 715/210 |
| 6,138,130 A | | 10/2000 | Adler et al. |
| 6,317,758 B1 | | 11/2001 | Madsen et al. |
| 6,828,988 B2 * | | 12/2004 | Hudson et al. ................ 715/711 |
| 6,829,607 B1 * | | 12/2004 | Tafoya et al. .......................... 1/1 |
| 6,986,099 B2 | | 1/2006 | Todd |
| 6,988,241 B1 | | 1/2006 | Guttman et al. |
| 7,143,338 B2 | | 11/2006 | Bauchot et al. |
| 7,222,294 B2 | | 5/2007 | Coffen et al. |
| 7,412,645 B2 * | | 8/2008 | Kotler et al. .................. 715/212 |
| 2003/0188258 A1 * | | 10/2003 | Aureglia et al. ............... 715/503 |
| 2003/0188259 A1 * | | 10/2003 | Aureglia et al. ............... 715/503 |
| 2004/0103366 A1 * | | 5/2004 | Peyton-Jones et al. ....... 715/503 |
| 2005/0050470 A1 * | | 3/2005 | Hudson et al. ................ 715/711 |
| 2010/0169759 A1 * | | 7/2010 | Le Brazidec et al. ......... 715/219 |

OTHER PUBLICATIONS

"Advanced Excel 97", Date: Oct. 10, 2000, pp. 1-18.
"Excel for Data Analysis", Copyright © 2003 by National Research Center, Inc., 3005 30th St .• Boulder, CO 80301, pp. 1-40.
"Excel Macros, Links and Other Good Stuff", Princeton University, Office of Information Technology, Product Code: MS Excel 2002-2 01.5, Date 2002, pp. 1-46.
"Introduction to the Excel Spreadsheet", Essential Microsoft Office 2000: Tutorial for Teachers, Date: 2000 Pages: Copyright © Bernard Poole, Rebecca Randall, 2000, pp. 67-96.

* cited by examiner

*Primary Examiner* — William Bashore
*Assistant Examiner* — David Phantana Angkool

(57) ABSTRACT

Various technologies and techniques are disclosed for utilizing spreadsheet references with grouped aggregate views. A grouped aggregate view feature enables a user to create a grouped aggregate view of data. A calculation feature enables the user to calculations for the grouped aggregate view of data that are based upon relative or absolute references to data in the grouped aggregate view. Input is received from a user to write a calculation within a first cell in a grouped aggregate view. Input is received from the user to select a second cell to reference when writing the calculation. The user is presented with available references that are relevant to data contained in the second cell. Input is received from the user to select one of the available references that are relevant for the second cell. The selected one of the available references is placed into the first cell.

15 Claims, 6 Drawing Sheets

UTILIZING SPREADSHEET REFERENCES WITH GROUPED AGGREGATE VIEWS

BACKGROUND

Spreadsheet programs and similar programs allow a user to specify data inside cells within various rows and columns. Once the data is entered, users can write formulas that perform calculations against the data in those cells. For example, calculations can be written to add one cell to another in order to generate a total value. Some spreadsheets can grow quite large in size, including hundreds if not thousands of cells of data.

The idea of grouped aggregate views (which are sometimes called pivot tables) was introduced to allow end users to create summary views of a larger set of data in the spreadsheet. Grouped aggregate views will automatically extract, organize, and summarize data from another location, such other sheet(s) in the spreadsheet or another region of the current sheet in the spreadsheet.

While grouped aggregate views are great for summarizing data, one issue that arises is that you cannot easily create calculations directly from within the grouped aggregate view to further refine the summary data being displayed. One issue that arises is that normal spreadsheet calculations cannot easily be applied in these grouped aggregate views. The problem in grouped views is that not all rows are of the same type. For example, some rows might represent totals for particular years, others for states, and others for cities. If a formula that calculates year-over-year growth is desired, the user cannot simply reference the previous row and expect that formula to work throughout the view.

SUMMARY

Various technologies and techniques are disclosed for utilizing spreadsheet references with grouped aggregate views. A grouped aggregate view feature enables a user to create a grouped aggregate view of data. A calculation feature enables the user to add calculations for the grouped aggregate view of data that are based upon relative or absolute references to data in the grouped aggregate view. Input is received from a user to write a calculation within a first cell in a grouped aggregate view. Input is received from the user to select a second cell to reference when writing the calculation. The user is presented with available references that are relevant to data contained in the second cell. Input is received from the user to select one of the available references that are relevant for the second cell. The selected one of the available references is placed into the first cell.

In one implementation, a method for creating calculations for data in a grouped aggregate view is described. Input is received from a user to select a cell to reference when the user is writing a calculation in a particular cell. A context of the selected cell is determined. The user is offered a plurality of relative and absolute references that are relevant to the context of the selected cell. The user to able to toggle through the offered references and select a desired reference.

This Summary was provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
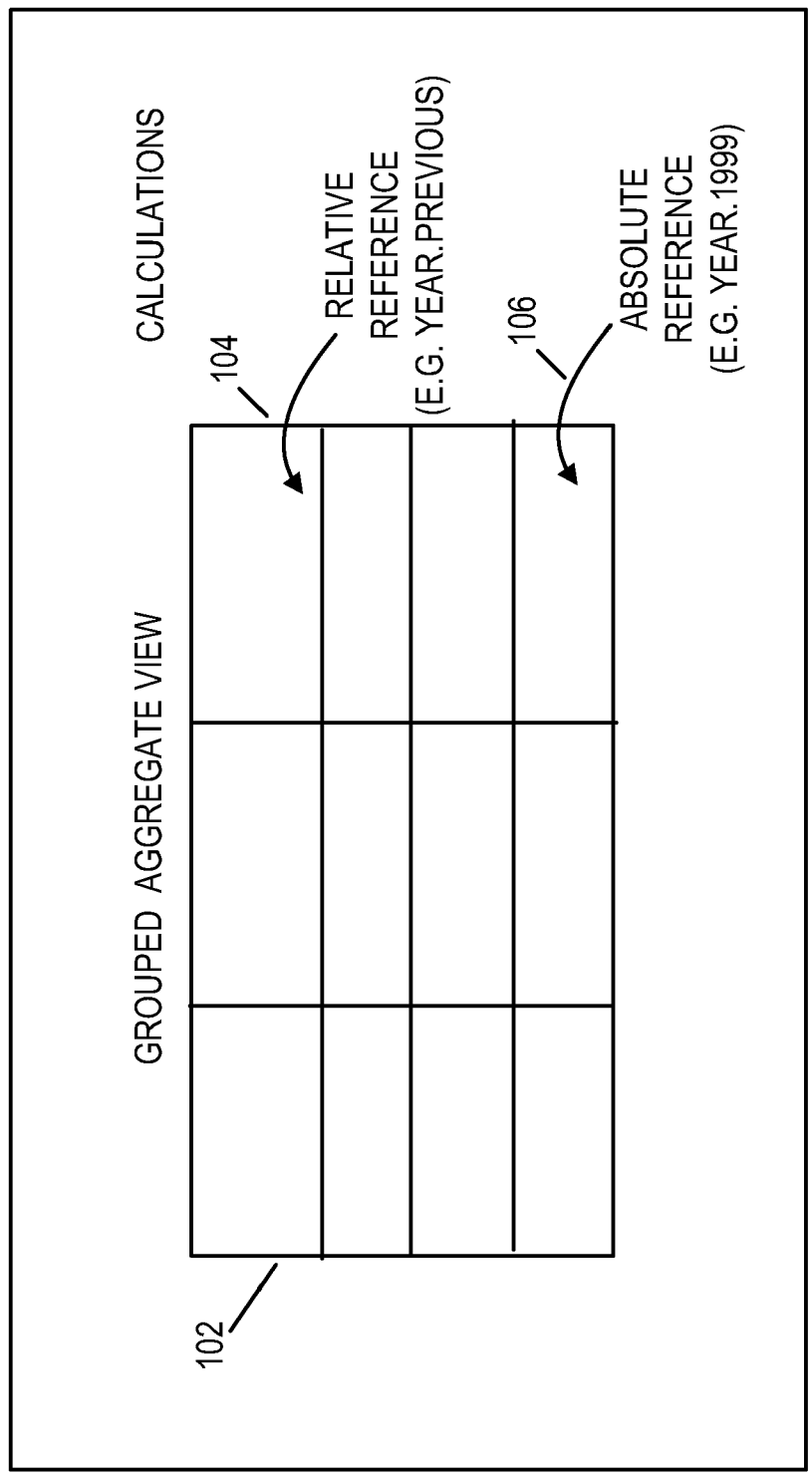
FIG. 1 is a diagrammatic view of system for creating calculations within grouped aggregate view in spreadsheets.

The technologies and techniques herein may be described in the general context as an application that enables calculations to be created within grouped aggregate views, but the technologies and techniques also serve other purposes in addition to these. In one implementation, one or more of the techniques described herein can be implemented as features within a spreadsheet program such as MICROSOFT® Office Excel, or from any other type of program or service that is responsible for generating and/or displaying grouped aggregate views.

In some existing spreadsheet programs, there are some calculations that can be easy to write against the data in the spreadsheet and other calculations that can be very difficult to write. For example, it can be relatively simple for a user of a spreadsheet program such as MICROSOFT® Office Excel to add a calculation that calculates the total sale amount for each row. In such a scenario, they could just add a new column that multiples the quantity column (e.g. column G) by the unit price column (e.g. column I), and then perhaps add a shipping column (e.g. column H. So if you wrote such a calculation in a highlighted cell (such as cell J3), the calculation would look like:

$$=(G3*I3)+H3$$

And after you copy that formula down the column, the formula in cell J4 (the cell below the one where you wrote the formula), you would see the following formula:

$$=(G4*I4)+H4$$

In many spreadsheet programs, the calculation is automatically adjusted to operate on its own row. This is a concept in spreadsheets known as a "relative reference" where you can write a calculation once and then apply that calculation in multiple places, with each copy of that calculation taking into account its own context (its location) in order to determine which data to grab as inputs.

There is also a notion of an "absolute reference". Suppose that you instead had written the original calculation as:

$$=(\$G\$3*\$I\$3)+\$H\$3$$

When you copy that calculation down, with an absolute reference, every copy of the calculation will continue to reference row 3 (instead of automatically being adjusted to reference its own row). Thus, the term "absolute reference" as used herein is meant to include calculations that ignores its context/location and simply grab the data at the absolute-specified location.

In some spreadsheet programs, the $ operator is what tells the spreadsheet program not to adjust the reference for current context. Some spreadsheet programs also offer a keyboard shortcut for rapidly toggling a reference between relative and absolute—if you have a reference to J3, and place the formula editing cursor within that J3, and then hit the F4 key, you get $J$3, meaning "always reference that specific cell." Hitting F4 again will toggle the reference to be J$3, which means "keep the row fixed at 3 but adjust the formula based on what column the formula is in." Similarly, hitting F4 again will toggle to $J3, which fixes the column but lets the row adjust. Another F4 returns the reference to pure relative J3.

Relative references can also be used to write calculations that operate across rows. For example, let's assume we added the Total column that was described above. Now, if you wanted to calculate how much bigger or smaller a particular sale was than the sale immediately prior to it, you could go into a selected cell and write this calculation:

$$=J4-J3$$

If you copy the calculation down the column, then the cell below where you wrote the calculation would now be:

$$=J5-J4$$

Again, this calculation was written once, and whenever applied to other rows, the previous row's value gets subtracted automatically from the current row (so the user does not have to write the calculation in each cell separately).

A more useful comparison that a user might like to make is to compare values within a grouped aggregate view, such as the total for a particular Day to the previous Day (or perhaps Year, or Month). The term "grouped aggregate view" as used herein is meant to include a view that summarizes data that was extracted from another location, such as other sheet(s) in a spreadsheet or another region of a current sheet in the spreadsheet. Grouped aggregate views are typically used to summarize large quantities of detailed data by showing the user numerical aggregates (totals, averages, etc.) of numerical value fields for each distinct value of one or more "groupby" fields, such as Year or Product.

Such a calculation can be difficult to do with existing spreadsheet programs. First of all, each formula needs to reference more than just single rows—it needs to reference collections of rows. Second, each input is not just a collection of rows, but the aggregate value across those rows (in this case, the sum, but it could be average, etc.). Third, the collection of rows that need to be taken as inputs needs to be selected based on whether they fit a filter criteria (in this case, whether the Year column equals a particular value). And lastly, even the context of where a formula lives is problematic—there is no sensible location for such a formula in the table above—no single sales transaction row is a good place to express a calculation that totals all sales for each Month, for instance.

In one implementation, techniques are described for enabling calculations to be written in grouped aggregate views. Such techniques allow the user to write calculations within the body of the grouped aggregate view. In another implementation, the user can click on cells in order to reference those cells while writing a calculation. Rather than giving the user a coordinate reference like B3, C4, etc., the user is presented with references that are related to the context of the data itself, like Year.1999 or Year.Previous. In another implementation, absolute references are supported in the grouped aggregate view. A non-limiting example of an absolute reference includes Year.1999. In another implementation, relative references are supported in the grouped aggregate view. A non-limiting example of a relative reference is Year.Previous. In yet another implementation, a toggle feature allows the user to toggle between all valid references to the selected cell, based on the cell in which the formula is being written and its relationship to the cell being referenced.

FIG. 1 is a diagrammatic view of system 100 for creating calculations within a grouped aggregate view 102 in spreadsheets. As described prevoiusly, a grouped aggregate view 102 is a view that summarizes data that was extracted from another location, such as other sheet(s) in a spreadsheet or another region of a current sheet in the spreadsheet. A calculation feature enables calculations containing relative references 104 (such as Year.Previous) to be added for one or more cells in the grouped aggregate view. Alternatively or additionally, the calculation feature enables calculations containing absolute references 106 (such as Year.1999) to be added for one or more cells in the grouped aggregate view.

Turning now to FIGS. 2-5, the stages for implementing one or more implementations of system 100 are described in further detail. In some implementations, the processes of FIG. 2-5 are at least partially implemented in the operating logic of computing device 500 (of FIG. 6).

Figure 2:
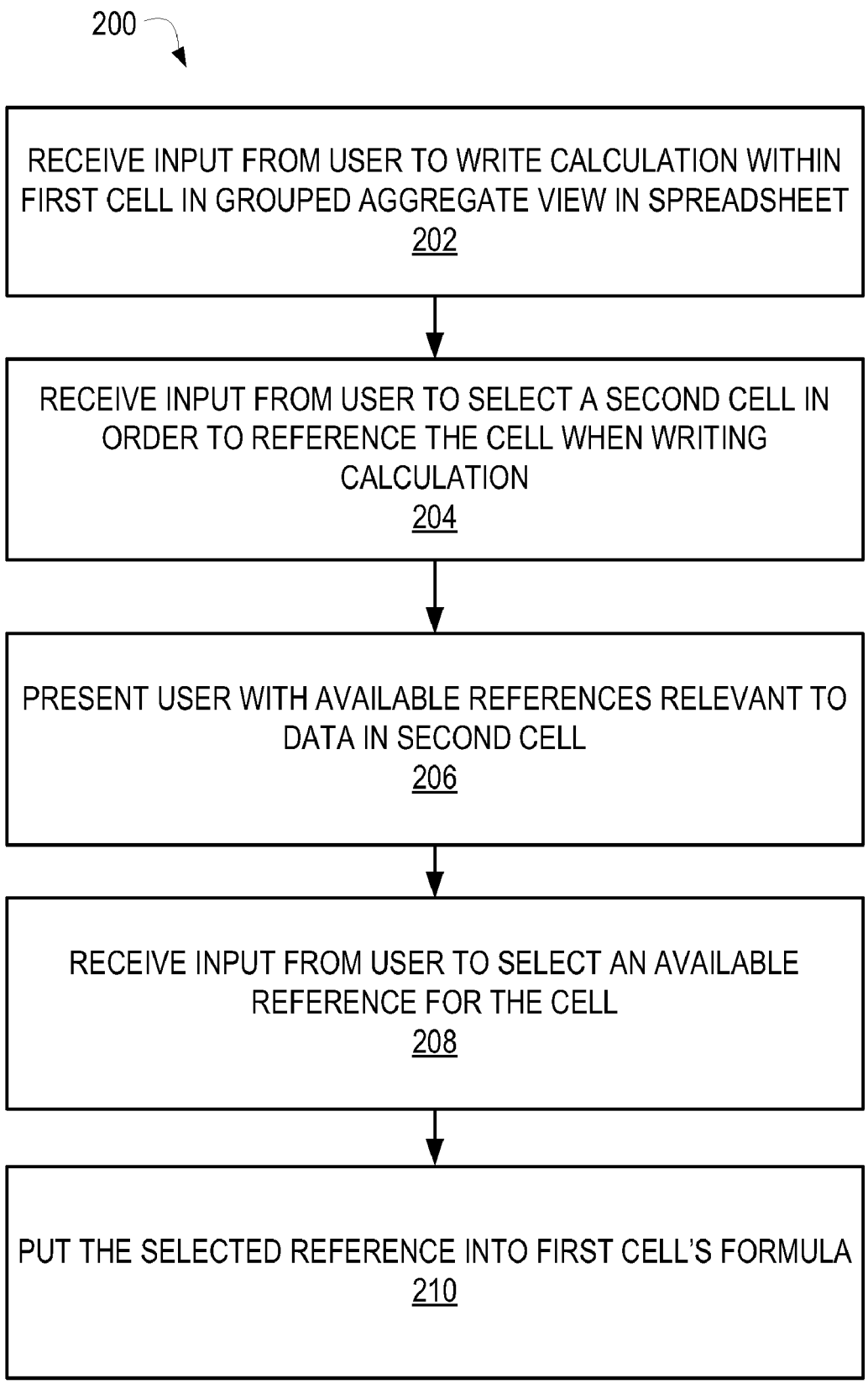
FIG. 2 is a process flow diagram for one implementation illustrating the high level stages involved in creating calculations within a grouped aggregate view in a spreadsheet.

FIG. 2 is a process flow diagram 200 for one implementation illustrating the high level stages involved in creating calculations within a grouped aggregate view in a spreadsheet. Input is received from a user to write a calculation within a first cell in a group aggregated view in a spreadsheet (stage 202). Input is received from the user to select a second cell in order to reference that cell when writing the calculation (stage 204). The user is presented with a list of available references that are relevant to the data in the second cell (stage 206). Input is received from the user to select an available reference for the second cell (stage 208). The selected reference is put into the first cell as part of the calculation (stage 210). These stages will be described in further detail in the discussion of FIGS. 3-5.

Figure 3:
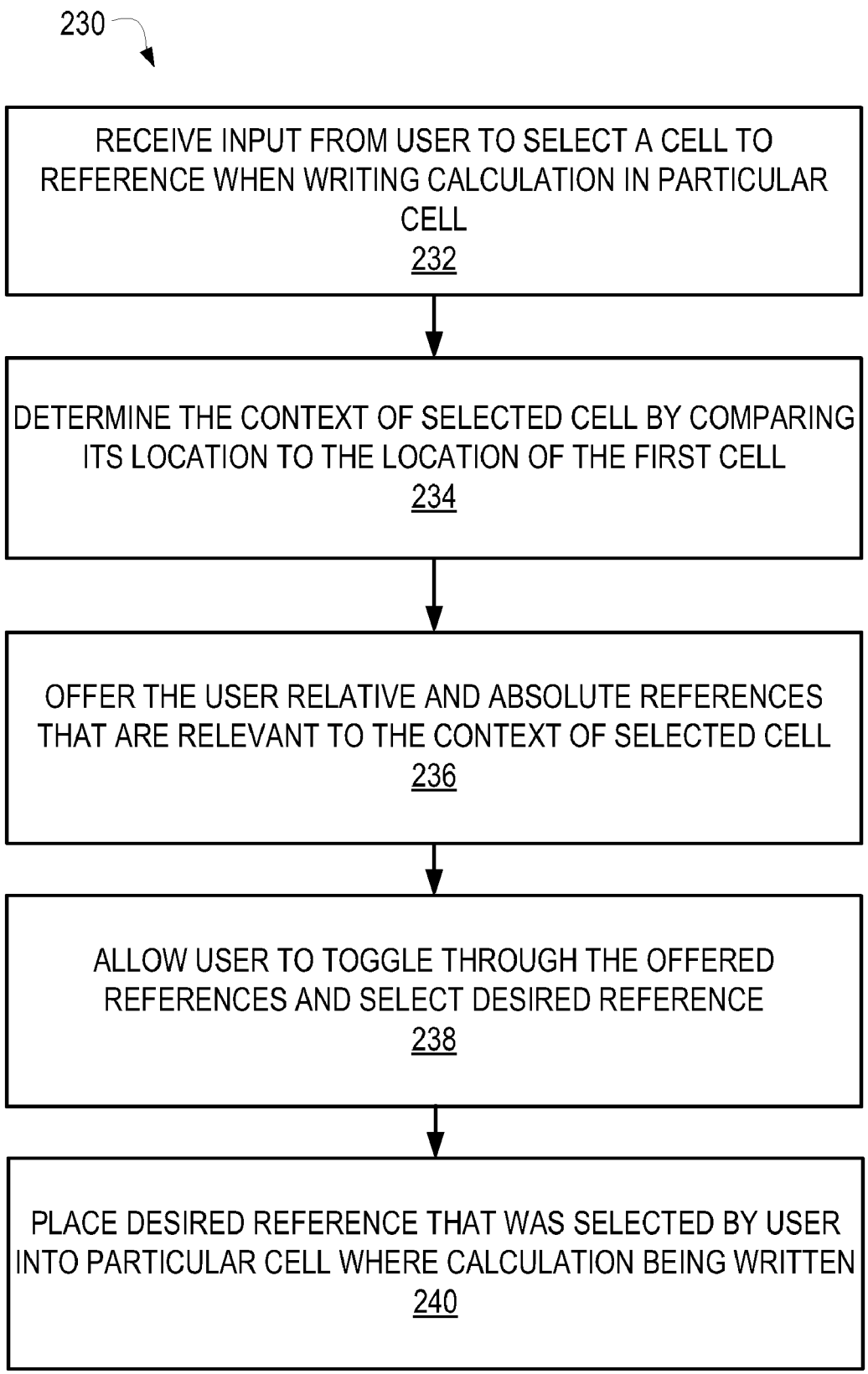
FIG. 3 is a process flow diagram for one implementation illustrating the more detailed stages involved in creating calculations within a grouped aggregate view in a spreadsheet.

FIG. 3 is a process flow diagram 230 for one implementation illustrating the more detailed stages involved in creating calculations within a grouped aggregate view in a spreadsheet. Input is received from a user to select the cell to reference when writing a calculation in a particular cell (stage 232). In other words, the user can select the cell to begin writing the formula, and then select another cell that the calculation will be related to. The context is determined for the selected cell (stage 234) to which the calculation will be related, such as by comparing the location of the selected cell (the referenced cell) to the location of the first cell where the formula is being written. There are various ways for determining the context for the referenced cell, and a few examples will now be described before returning to the rest of the process of FIG. 3.

In one implementation, the context of the referenced cell is determined by enumerating a set of "group by" fields in the aggregated view (ex: Year, Product, Region). The term "groupby field" as used herein is meant to include a field by which numerical values (the value fields) are being grouped in a grouped aggregated view. So for example, if Year is a groupby field in a particular view, for each value of Year (1999, 2000, etc.), the numerical value field will display a number that represents the aggregate of all underlying data associated with that year, such as the total of all Sales for 1999, the total of all Sales for 2000, etc.

Then, for each groupby field, a determination is made on whether the selected cell has a different value of that field as compared to the original (formula) cell. If the value for a particular groupby field is the same in the referenced cell as in the formula cell, (ex: Year=1999 for both), then the user is offered with the choice of CurrentContext or an absolute reference to the selected value. Setting a field to CurrentContext means "when calculating this formula on a cell-by-cell basis, use the current value of this field," which is another way of saying "don't change this field's value when calculating the formula". An example syntax for this could be:

Year=CurrentContext

In one implementation, using CurrentContext is the same as omitting Year from the reference altogether. In other words, a groupby field is not changed at calculation time unless the user explicitly included it in the formula. In one implementation, CurrentContext is essentially a token—meaning that any symbol or string could be used. In the examples provided herein, a * is used, although others could be used too.

Another option that is offered to the user when a groupby field is the same in both cells is to fix that groupby field to that value. So for example, if Year=1999 in both cells, Year=1999 would be offered as an alternative to CurrentContext. Note that if a groupby field is set to All in both cells, then All is offered as the absolute reference as opposed to a single value.

If instead, the value of a particular groupby field is different when comparing the referenced cell with the formula cell, then the user is offered the choice of absolute vs. relative reference for that field (ex: Year=1999 or Year=Year−1, or =Year−2, etc.). In one implementation, the absolute reference option is determined strictly on the basis of the referenced cell. So if the user referenced a cell where Year=1999, then 1999 is offered as the absolute option.

In one implementation, the relative reference option that gets offered to the user is determined by comparing the referenced and formula cells and finding the "distance" between them for this field, resulting in a reference like Year=Year−1 (or Year=Year−2, etc.) for instance. An exception to this is if a groupby field is set to All in the referenced cell, then the user is only offered an option of All for that field (there is no difference between relative and absolute All in this case).

A determination is also made for the "value" field that was referenced. The value field can be determined by the column of the referenced cell. The term "value field" as used herein is a numerical field in the aggregated view that conveys actual statistics to the reader of the view. Examples include Sales, Costs, etc. In the example in FIG. 4, the value field is Sales for instance. For explanation purposes, this results in a reference that is a list of values for each groupby field, so something like:

{Value=Sales, Year=Year−1, Region=NW,
       Product=CurrentContext}

Based upon one or more of the techniques described above, the relative and absolute references that are relevant to the context of the selected cell are determined, and are then presented to the user (stage 236). The user is able to toggle through the offered references and select the desired reference (stage 238). In one implementation, the user can toggle through the offered references using a keyboard shortcut such as an [F4] key on the keyboard. The desired reference that was selected by the user is placed into the particular cell where the calculation is being written (stage 240). Detailed examples will now be described in FIGS. 4 and 5 to explain these concepts more fully.

Figure 4:
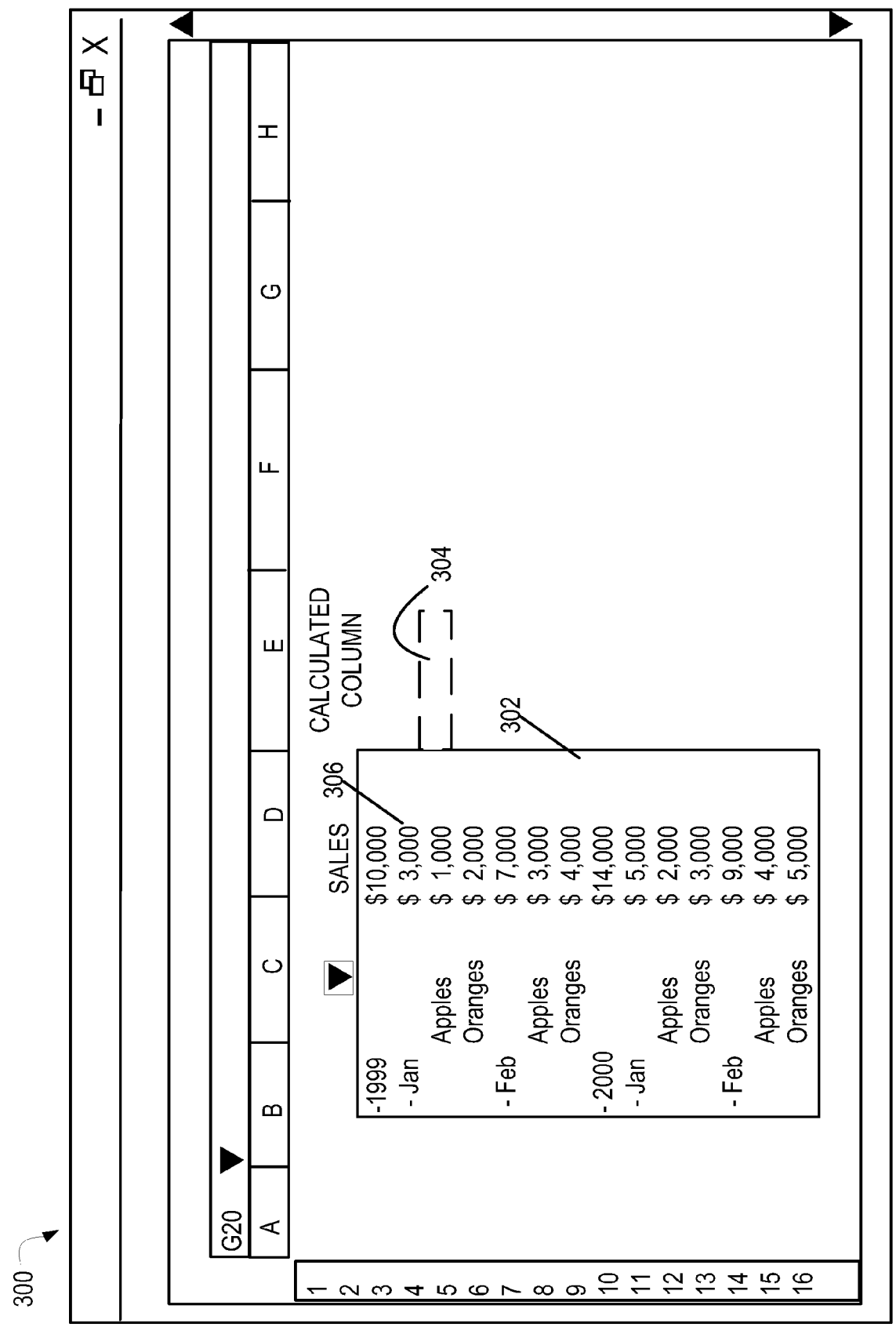
FIG. 4 is a simulated screen for one implementation that illustrates an exemplary grouped aggregate view for which a calculation can be added.

FIG. 4 is a simulated screen 300 for one implementation that illustrates an exemplary grouped aggregate view 302 for which a calculation can be added, such as in cell E5 (304), for which the user then selects cell D4 (306) as the referenced cell. If cell D4 (306) was selected as the referenced cell, then the user would be offered the following values that can be selected for the computation:

Value=Sales, Product=All, Month=CurrentContext
       OR Jan, Year=CurrentContext OR 1999}

Figure 5:
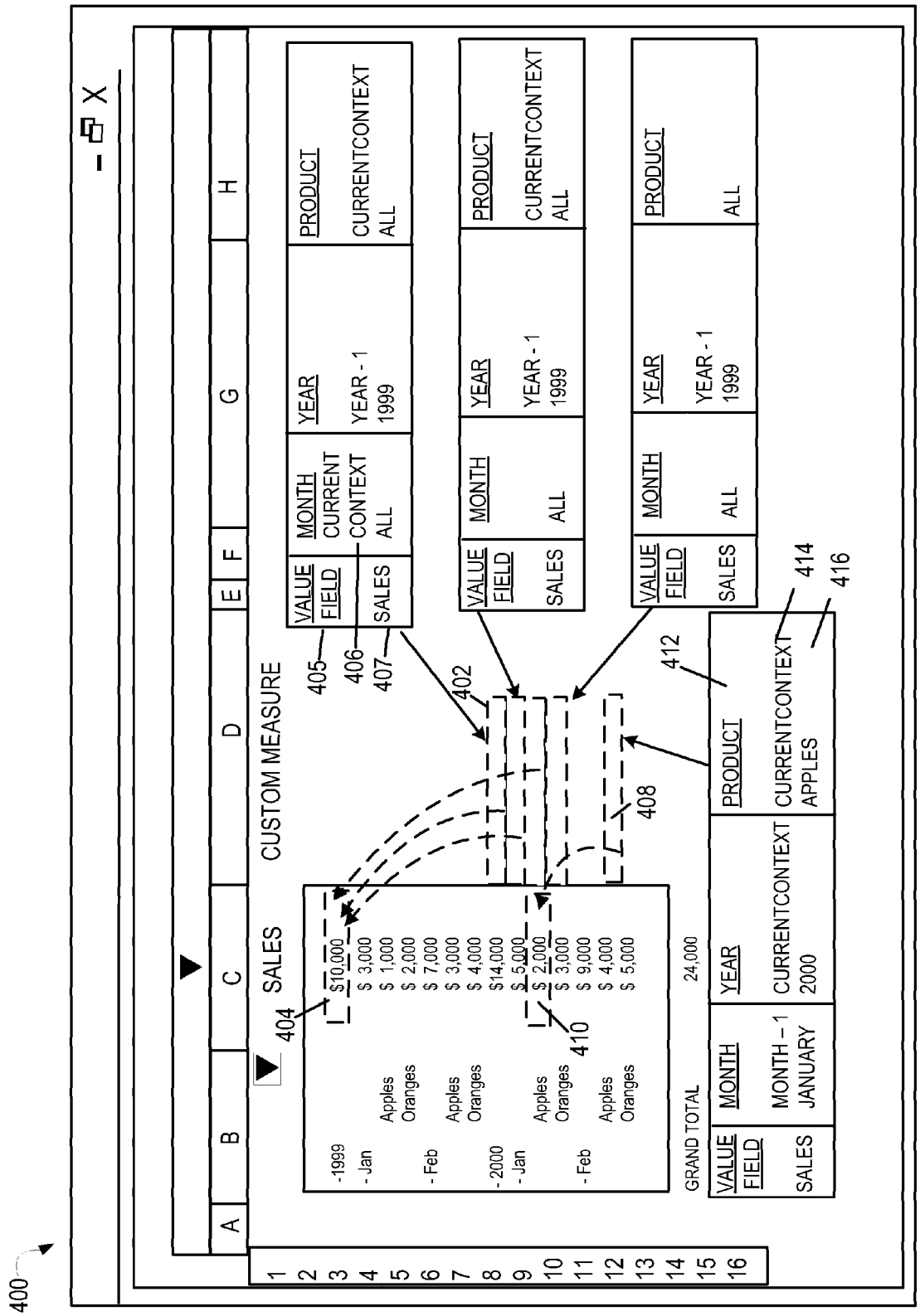
FIG. 5 is a simulated screen for one implementation that illustrates exemplary absolute and relative references that are available for the grouped aggregate view of FIG. 4.

FIG. 5 is a simulated screen 400 for one implementation that illustrates exemplary absolute and relative references (405, 412, etc.) that are available for the grouped aggregate view of FIG. 4 based upon the cell that is selected. Different absolute and relative references are displayed to the user as options depending on the cell in which the user starts to write the calculation, and the cell in which the user points as the cell to use for reference. The cell initially selected by the user is indicated by a dashed line arrow to the cell also being referenced in the calculation, and the corresponding list of references available based upon that context of the data is shown with the solid line arrow.

Suppose, for example, that the user selects cell 402 (cell D8) for writing a calculation. Further suppose that the user selects cell 404 (cell C3) as the reference to use for creating the calculation in cell 402. The relative and absolute references shown in table 405 are made available to the user for selection. While these relative and absolute references are shown directly in the spreadsheet in FIG. 5, these are just shown on the spreadsheet for the sake of explanation. In one implementation, they would be presented to the user in a selectable list of another type of view that allows the user to select a particular one from the list of available references. Let's examine the absolute and relative references that are listed in table 406 in further detail. Given that the user selected cell 404 (cell C3) as the reference to use for creating the calculation in cell 402, then the relative and absolute references that are available are adjusted based upon the selected context. In this particular scenario, the relative references available for month, year, and product are listed on line 406 of table 405. For example, CurrentContext is available for the month, Year−1 is available for the year, and current context is available for the product. Row 407 lists the absolute references, which in this example is all for the month, 1999 for the year, and all for the product.

Assuming that the user chooses all of the relative options, they would get something like as the formula for cell 402.

={Value = Sales, Month = *CurrentContext*,

Year = Year − 1, Product = *CurrentContext*}

And since setting a field to CurrentContext is equivalent to omitting that field from the formula altogether, the formula above can be simplified to the following more readable version: ={Value=Sales, Year=Year−1}

After inserting this calculation, then the following values would get populated into column D from top to bottom in the grouped aggregate view:
   #N/A
   #N/A
   #N/A
   #N/A
   #N/A
   #N/A
   #N/A
   10,000
   3,000
   1,000
   2,000
   7,000
   3,000
   4,000

In the example results above, all of the 1999 cells return #N/A because there is no prior year to retrieve data from.

As a more realistic example, a user may want to subtract last year's sales from the current sales in order to get some sort of growth formula. Such a formula could look something like this:

={Value=Sales}-{Value=Sales,Year=Year-1}

Again note that the above example has omitted all of the CurrentContext fields for the sake of simplicity. Such a formula would yield the following results:

N/A
N/A
N/A
N/A
N/A
N/A
N/A
4,000
2,000
1,000
1,000
2,000
1,000
1,000

Returning to the discussion of the items in table 405, the "Current Context", "Year-1" values are relative references that get adjusted depending on the context of the data to which they refer. If "Year-1" is selected for the year, then the value from the same month in the prior year would be displayed after the calculation is entered.

As another non-limiting example, suppose the user has selected cell 408 (cell D12) as the location for creating a calculation, and that the user selected cell 410 (cell C10) to use as the cell to reference for the context of the references that get displayed. The references that the user can select are displayed in table 412, but as described earlier, these values would be presented to the user in a list or other selectable format. In this situation, the relative references are displayed in row 414, and the absolute references are displayed in row 416. Notice how the values for the references that are available in table 412 are different than the references that are available in table 406. The reason is because the context of the cell that the user selected for the calculation and for the cell to use for context cause the references that get offered to be different such that they are relevant to the current context.

For table 412, let's assume the user chose January, 2000, and CurrentContext (not a realistic scenario but illustrative). The formula would look like:

={Value=Sales,Month=January,Year=2000,
    Product=CurrentContext}

With omitting current context values, that formula would then be:

={Value=Sales,Month=January,Year=2000}

That would return the following results being inserted into the corresponding cells in column D for the grouped aggregate view:

5,000 (all products in January 2000)
5,000 (same)
2,000 (apples from January 2000)
3,000 (oranges from January 2000)
5,000 (etc.)
2,000
3,000
5,000
5,000
2,000
3,000
5,000
2,000
3,000

Regardless of which cell the user writes their formula, Cells D3 through D13 will all be filled in with numerical values, and the formula will then react to the context of each cell in column D. In other words, the user writes the computation in one cell, and the system automatically populates additional cells with a respective variation of the calculation that is appropriate for the additional cells. For example, relative references will be evaluated based on each cell's context, whereas absolute references will not. This feature allows the user to write one computation and have it apply in the other surrounding cells that are related.

These examples contained herein are just described for the sake of illustration of these concepts, and numerous other types of absolute and relative references could be used in other implementations.

Figure 6:
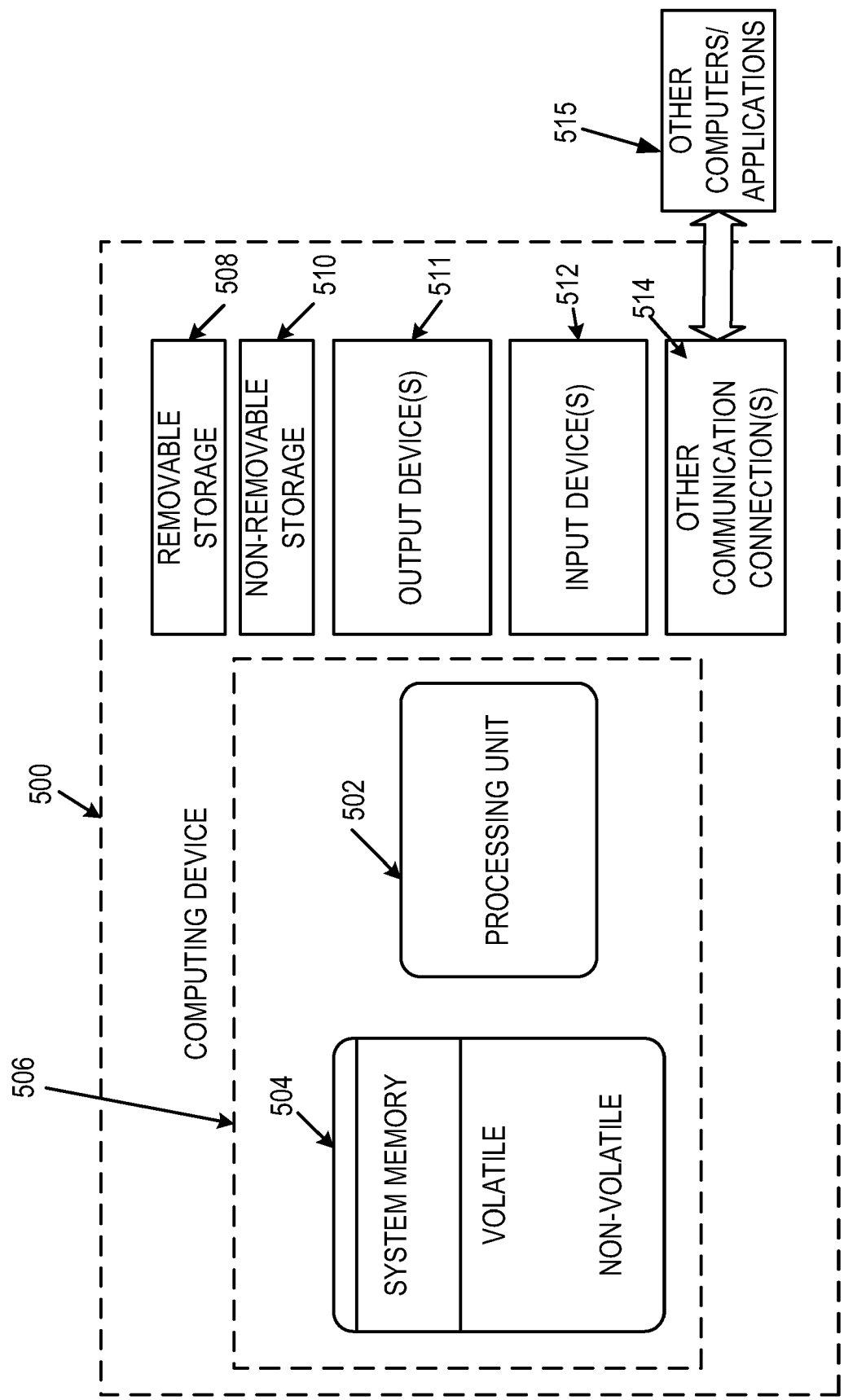
FIG. 6 is a diagrammatic view of a computer system of one implementation.

As shown in FIG. 6, an exemplary computer system to use for implementing one or more parts of the system includes a computing device, such as computing device 500. In its most basic configuration, computing device 500 typically includes at least one processing unit 502 and memory 504. Depending on the exact configuration and type of computing device, memory 504 may be volatile (such as RAM), non-volatile (such as ROM, flash memory, etc.) or some combination of the two. This most basic configuration is illustrated in FIG. 6 by dashed line 506.

Additionally, device 500 may also have additional features/functionality. For example, device 500 may also include additional storage (removable and/or non-removable) including, but not limited to, magnetic or optical disks or tape. Such additional storage is illustrated in FIG. 6 by removable storage 508 and non-removable storage 510. Computer storage media includes volatile and nonvolatile, removable and non-removable media implemented in any method or technology for storage of information such as computer readable instructions, data structures, program modules or other data. Memory 504, removable storage 508 and non-removable storage 510 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 500. Any such computer storage media may be part of device 500.

Computing device 500 includes one or more communication connections 514 that allow computing device 500 to communicate with other computers/applications 515. Device 500 may also have input device(s) 512 such as keyboard, mouse, pen, voice input device, touch input device, etc. Output device(s) 511 such as a display, speakers, printer, etc. may also be included. These devices are well known in the art and need not be discussed at length here.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the implementations as described herein and/or by the following claims are desired to be protected.

For example, a person of ordinary skill in the computer software art will recognize that the examples discussed herein could be organized differently on one or more computers to include fewer or additional options or features than as portrayed in the examples.

What is claimed is:

1. A system for creating calculations within grouped aggregate views of spreadsheets:
   a computing device comprising:
   a grouped aggregate view feature which enables a user to create a grouped aggregate view of data;
   a calculation feature which enables the user to create one or more calculations for the grouped aggregate view of data, the one or more calculations being based upon references to data in the grouped aggregate view, wherein the references to data in the grouped aggregate view include at least one relative reference to data and at least one absolute reference to data, the at least one relative reference takes into account its own location to determine which data to provide, the at least one absolute reference provides data at an absolute-specified location, wherein the calculation feature allows the user to select a first cell in which to place a respective one of the calculations, and also allows the user to select a second cell to reference as part of the respective one of the calculations; and
   a toggle feature which allows the user to toggle between a list of available references to data for the second cell that can be selected as part of the one or more calculations, the available references to data being related to the data in the grouped aggregate view.

2. The system of claim 1, wherein the toggle feature is operable to display a list of absolute references to data and a list of relative references to data that can be selected as part of the one or more calculations.

3. The system of claim 1, wherein the calculation feature is operable to allow the user to directly enter into a selected cell a particular calculation containing an absolute reference to at least part of the data in the grouped aggregate view.

4. The system of claim 1, wherein the calculation feature is operable to allow the user to directly enter into a selected cell a particular calculation containing a relative reference to at least part of the data in the grouped aggregate view.

5. A method for enabling calculations to be written within a grouped aggregate view in a spreadsheet comprising the steps of:
   receiving input from a user to write a calculation within a first cell in a grouped aggregate view in a spreadsheet;
   receiving input from the user to select a second cell to reference when writing the calculation;
   presenting the user with a list of available references to data in the spreadsheet that are relevant to data contained in the second cell, wherein the references to data include at least one relative reference to data and at least one absolute reference to data, the at least one relative reference takes into account its own location to determine which data to provide, the at least one absolute reference provides data at an absolute-specified location;
   receiving input from the user to select one of the available references that are relevant for the second cell; and
   putting the selected one of the available references into the first cell.

6. The method of claim 5, wherein the grouped aggregate view is a pivot table.

7. The method of claim 5, wherein the available references presented to the user include relative references that are relevant to the data of the second cell.

8. The method of claim 5, wherein the available references presented to the user include absolute references that are relevant to the data of the second cell.

9. The method of claim 5, wherein the available references presented to the user include relative references and absolute references that are relevant to the data of the second cell.

10. The method of claim 5, wherein prior to receiving input from the user to select one of the available references, receiving a selection from the user to toggle through the available references until a desired reference is reached.

11. The method of claim 5, further comprising when the user has finished creating the calculation in the first cell, automatically populating additional cells with a respective variation of the calculation that is appropriate for the additional cells.

12. A method for creating calculations for data in a grouped aggregate view comprising the steps of:
   receiving input from a user to select a cell to reference when the user is writing a calculation in a particular cell of a spreadsheet;
   determining a context of the selected cell;
   providing the user with a list of a plurality of relative and absolute references to data in the spreadsheet that are relevant to the location of the selected cell;
   allowing the user to toggle through the listed references and select a desired reference;
   placing the desired reference that was selected by the user into the particular cell where the calculation is being written; and
   when the user has finished creating the calculation in the particular cell, automatically populating additional cells with a respective variation of the calculation that is appropriate for the additional cells.

13. The method of claim 12, wherein the user can toggle through the offered references by pressing a keyboard shortcut.

14. The method of claim 12, wherein the keyboard shortcut is an [F4] key on a keyboard.

15. The method of claim 12, wherein the grouped aggregate view is a pivot table.

* * * * *